United States Patent Office 3,616,474
Patented Nov. 2, 1971

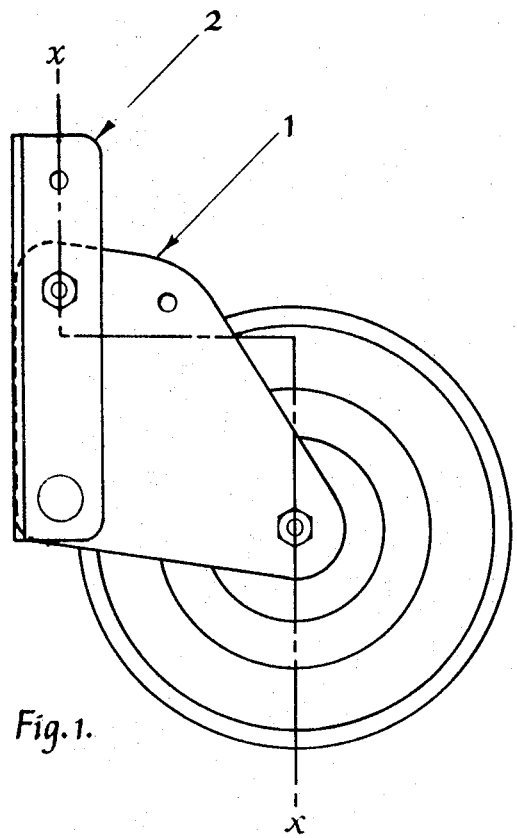
Fig. 1.
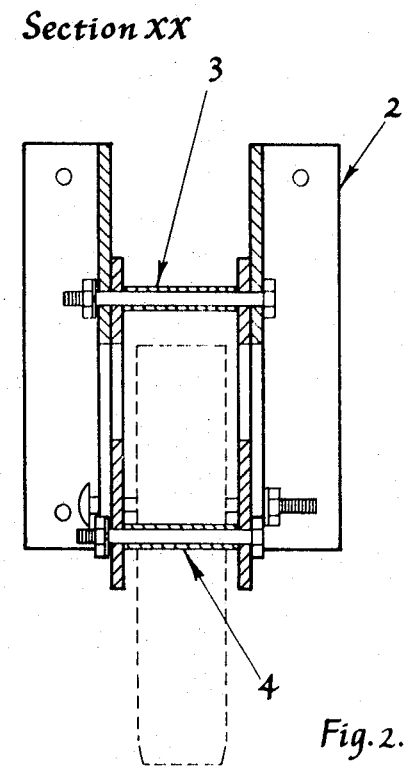
Fig. 2.
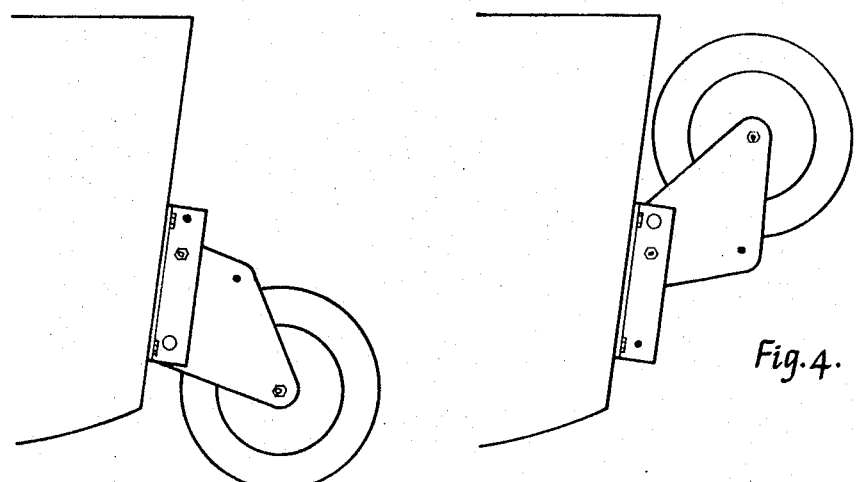
Fig. 3.
Fig. 4.

3,616,474
RETRACTABLE BOAT LAUNCHING WHEEL
Cyril Martin Lindblad, 1533 East Ave.,
Napa, Calif. 94558
Filed Nov. 7, 1969, Ser. No. 870,217
Int. Cl. B63c
U.S. Cl. 9—1 T                                    1 Claim

ABSTRACT OF THE DISCLOSURE

A retractable launching wheel having two aluminum angle beams secured to the transom of the boat. Two plates with a wheel thereon are pivotally attached to the beams and movable from a retracted to an extended position.

---

The retractable boat launching wheel is to allow a boat to be launched or retrieved from the water while fully loaded with the motor, fuel tank, small children, etc., on board. It is designed to eliminate the hazardous practice of carrying the motor into the boat and of mounting it to the transom while the boat is in the water.

FIG. 1 is a side view of wheel assembly;
FIG. 2 is a sectional view taken along section line XX of FIG. 1,
FIG. 3 shows the wheel assembly in an extended position; and
FIG. 4 shows the wheel assembly in a retracted position.

Simplicity of design and operation follows: Aluminum angle beam of L-shape is used as the mounting brackets for fastening the wheel and plates to the boat transom. The brackets 2 are mounted approximately 1½" from the bottom of the transom. The wheel plates 1, two (2) each, are attached to the mounting brackets 2 with a bolt or removable pivot pin, through a spacer 3, between the plates. The spacer is the width of the wheel to be used. The spacer is used to keep the plates parallel to each other and to prevent any binding on the wheel. The wheel plates rotate the wheel down raising the transom off the ground. A locking pin through the brackets and the plates keep the wheel in the DOWN position. A safety pin through the lock pin keeps the locking pin from slipping out. With the boat in the water the safety pin is removed, the lock pin is removed, the wheel rotated to the UP position, and the lock pin and safety pin reinstalled.

The invention described above relates to a plate and bracket mounting arrangement which will allow a boat to be launched safely and effortlessly while containing all the necessary equipment for a water borne journey.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. In combination a boat and a wheeled support therefor, said wheeled support comprising a pair of L-shaped aluminum beams, each of said beams being secured to the transom of said boat, a pair of plates pivotally secured to said beams by a pivot pin that extends through said beams and said plates, a spacer disposed around said pin and extending between said plates, said pivot pin being a bolt with a head on one end and a nut threadedly engaged on the other end, a wheel secured to said plates by a bolt extending through said plates, upper and lower holes in both said beams and said plates and a removable bolt selectively engageable in said upper or lower holes to hold said wheel and said plates in extended or retracted positions.

References Cited

UNITED STATES PATENTS 2,916,747  12/1959  Parrott _____ 9—1 TR
3,134,111   5/1964  Atwood _____ 9—1 TR TRYGVE M. BLIX, Primary Examiner U.S. Cl. X.R.
280—414 A